Jan. 31, 1967  H. F. SCHOEMEHL ET AL  3,302,128
CONTROLLED RECTIFIER RELAXATION OSCILLATOR
Filed Nov. 18, 1964

HENRY F. SCHOEMEHL
JACQUES A. TAZARTES
INVENTORS.

BY *Lyon & Lyon*

ATTORNEYS

United States Patent Office 3,302,128
Patented Jan. 31, 1967

---

3,302,128
CONTROLLED RECTIFIER RELAXATION OSCILLATOR
Henry F. Schoemehl, La Crescenta, and Jacques A. Tazartes, Hollywood, Calif., assignors to Hoffman Electronics Corporation, El Monte, Calif., a corporation of California
Filed Nov. 18, 1964, Ser. No. 412,207
4 Claims. (Cl. 331—107)

This invention relates to a pulse generator and more particularly relates to a solid state pulse generating circuit.

There are many applications for a simple, small and reliable circuit which continuously produces a train of low frequency pulses. For example, highway flashers, aircraft clearance flashers, automotive turn signals and fence electrifier systems all require some such circuit. At the present time, such devices are commonly provided with circuits which include mechanical or thermal switches. These circuits are all subject to the common failing of such switches, i.e., wear, contact arcing, bulk, etc. Various electronic circuits are available for producing such a train of pulses, but these circuits all include a relatively large number of electronic devices such as vacuum tubes or transistors and thus their cost is prohibitive.

It is therefore an object of the present invention to provide a solid state pulse generating circuit that is simple, small, reliable and relatively inexpensive.

It is also an object of the present invention to provide such a circuit in which the current flow is controlled by a controlled rectifier.

It is another object of the present invention to provide such a circuit in which the controlled rectifier is caused to periodically conduct by the breakdown of a Zener diode.

These and other objects and advantages of the present invention will become more apparent upon reference to the accompanying description and drawings in which.

Figure 1:
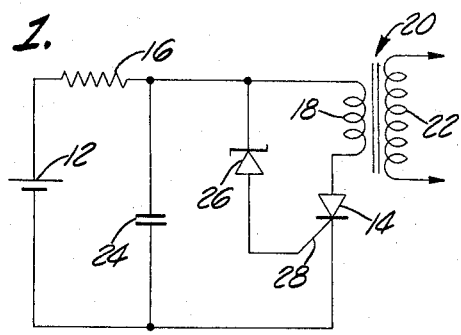
FIGURE 1 is a schematic diagram of a first embodiment of a pulse generating circuit according to the present invention.

Turning now to FIGURE 1, a battery 12 is connected in a series circuit with a silicon controlled rectifier 14 and a resistor 16. Also included in this circuit is the primary 18 of an output transformer 20, the output of the circuit appearing across the secondary winding 22 of this transformer. A capacitor 24 is connected across the primary winding 18 and silicon controlled rectifier 14. A Zener diode 26 is connected between the junction of the resistor 16 and the primary winding 18 and the gate 28 of the controlled rectifier 14.

In the operation of the circuit of FIGURE 1, the resistance 16 is of a sufficient value so that the D.C. current in the circuit is less than the holding current of the controlled rectifier 14 so that it is impossible for this rectifier to remain conducting under the sole influence of the battery. Let us now assume that the controlled rectifier 14 is non-conducting and the capacitor 24 is discharged. The capacitor 24 will begin to charge through the resistance 16, the combination having a predetermined RC time constant. When the voltage across the capacitor 24 reaches a level equal to the Zener breakdown voltage of the Zener diode 26 plus the gate voltage of the controlled rectifier 14, the Zener diode 26 will start conducting toward the gate 28 of the controlled rectifier 14. This will cause the controlled rectifier 14 to fire and discharge the capacitor 24 through the primary 18 of the output transformer 20 thereby producing a pulse across the secondary winding 22. When the capacitor 24 has discharged sufficiently to cause the Zener diode 26 to cease conducting, the D.C. current flowing through the controlled rectifier 14 will be below its holding current and it will cease to conduct, permitting the capacitor 24 to recharge.

Figure 3:
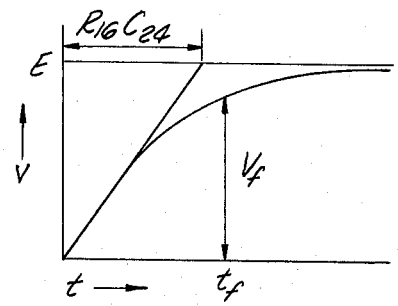
FIGURE 3 illustrates the operating characteristics of the circuit of FIGURE 1.

FIGURE 3 shows a plot of voltage against time, the source or battery voltage being indicated by E and the voltage equal to the Zener breakdown voltage plus the gate voltage of the controlled rectifier 14 being indicated by $V_f$. This voltage $V_f$ across the capacitor which causes the controlled rectifier 14 to fire should be substantially below the power supply voltage E if definite, reliable firing is to be achieved. Past the time $f_t$ at which this voltage $V_f$ is searched, the slope of the charging curve is too small to allow a reasonably constant firing time and a non-critical sensitivity to power supply variations. The voltage across the load (primary winding 18) would therefore be lower than the maximum value E.

Figure 2:
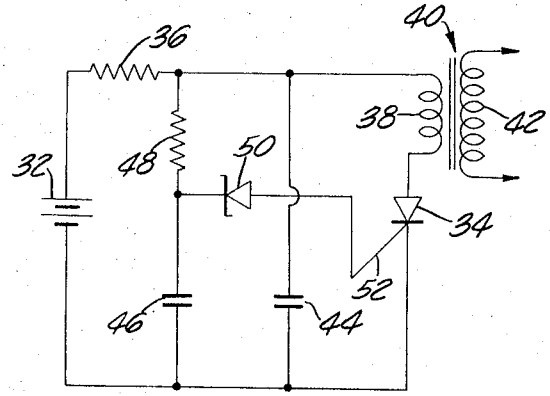
FIGURE 2 is a schematic diagram of a second embodiment of a pulse generating circuit according to the present invention.

Turning now to FIGURE 2, there is shown a circuit which permits the load voltage to more nearly approach the power supply voltage. In this circuit, a battery 32 is connected in a circuit with a silicon controlled rectifier 34 and a resistor 36. Also connected in this series circuit is the primary winding 38 of an output transformer 40 having a secondary winding 42. A first capacitor 44 is connected across the controlled rectifier 34 and primary winding 38. A second capacitor 46 is connected in series with a resistor 48 across the controlled rectifier 34 and the primary winding 38. A Zener diode 50 is connected between the junction of the capacitor 46 and resistor 48 and the gate 52 of the controlled rectifier 34.

The circuit of FIGURE 2 is also arranged so that the resistor 36 limits the current through the controlled rectifier 34 to a value below its holding current. In this circuit, however, the Zener diode voltage increased by the gate voltage of the controlled rectifier 34 can be made much lower than the power supply voltage E while the voltage across the capacitor 44 can be designed to very nearly equal the voltage E. This situation is achieved by making the time constant of the network including resistor 36 and the capacitor 44 much less than the time constant of the network including resistor 36—resistor 48 and the capacitor 46. Thus, the capacitor 44 becomes fully charged before the Zener diode 50 is caused to break down by the voltage on the capacitor 46.

Figure 4:
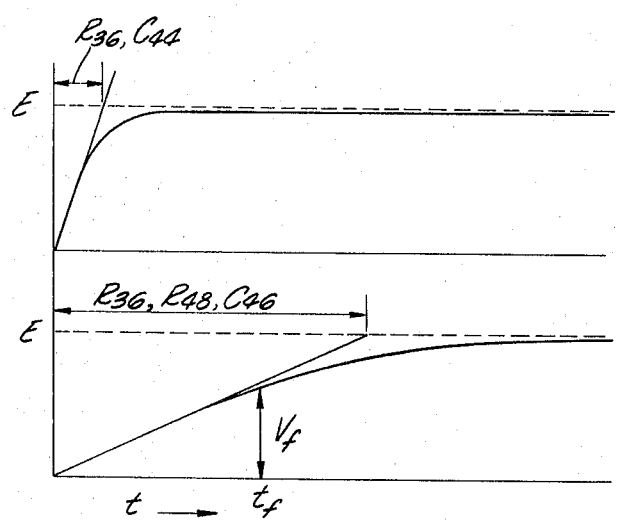
FIGURE 4 illustrates the operating characteristics of the circuit of FIGURE 2.

Once the Zener diode 50 does break down, the capacitor 44 will be discharged through the now conducting controlled rectifier 34 with the result that an output pulse will appear across the secondary winding 42 of the transformer 40. As can be seen from FIGURE 4, at time $t_f$ when the firing voltage $V_f$ is reached on capacitor 46, the capacitor 44 has been charged to substantially the value of the power supply voltage E. This circuit enables a much higher output voltage to be obtained without any sacrifice of reliability and reasonable constancy in frequency since at the firing time $t_f$ the voltage curve across the capacitor 46 has a high slope.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A pulse generating circuit comprising: a load, first resistance means; a controlled rectifier; circuit means coupling said first resistance means, said load and said controlled rectifier in a series circuit; first capacitor means coupled in parallel with said load and said controlled rectifier; second resistance means; second capacitor means; circuit means coupling said second resistance means and said second capacitor means in a series circuit in parallel with said first capacitor means; a Zener diode having a pair of leads coupled between the junction of said second resistance means and said second capacitor means and the gate of said controlled rectifier for causing said rectifier to become conductive when the voltage across said second capacitor means exceeds a predetermined value whereby said first capacitor means discharges through said load and said controlled rectifier; and means for coupling said first named series circuit to a source of D.C. voltage.

2. A pulse generating circuit comprising: a load; first resistance means; a silicon controlled rectifier; circuit means coupling said first resistance means, said load, and said controlled rectifier in a series circuit; first capacitor means coupled in parallel with said load and said controlled rectifier; second resistance means; second capacitor means; circuit means coupling said second resistance means and said second capacitor means in a series circuit in parallel with said first capacitor means; a Zener diode coupled between the junction of said second resistance means and said second capacitor means and the gate of said controlled rectifier for causing said rectifier to become conductive when the voltage across said first capacitor means exceeds the breakdown voltage of said Zener diode plus the gate voltage of said controlled rectifier whereby said first capacitor means discharges through said load and said controlled rectifier; and means for coupling said first named series circuit to a source of D.C. voltage, the resistance of said first resistance means being such that the current supplied to said controlled rectifier by said source is below the holding current of said controlled rectifier.

3. The circuit of claim 2 wherein the time constant of said first resistance means and said first capacitor means is less than the time constant of said first resistance means, said second resistance means, and said second capacitor means.

4. A pluse generating circuit comprising: a source of D.C. voltage; a first resistor; a load; a silicon controlled rectifier; circuit means connecting said source, said first resistor, said load and said controlled rectifier in a series circuit, said first resistor having a resistance such that the current supplied to said controlled rectifier by said source is below the holding current of said controlled rectifier; a first capacitor connected in parallel with said load and said controlled rectifier; a second resistor; a second capacitor; circuit means connecting said second resistor and said second capacitor in a series circuit in parallel with said first capacitor; said first resistor and said first capacitor forming a first time constant network, said first resistor, said second resistor and said second capacitor forming a second time constant network, said second time constant network having a greater time constant than said first time constant network; a Zener diode having a pair of leads connected between the junction of said second resistor and said second capacitor and the gate of said controlled rectifier; charging of said second capacitor by said source to a value in excess of the breakdown voltage of said Zener diode plus the gate voltage of said controlled rectifier causing said Zener diode to break down and render said controlled rectifier conductive thereby enabling said first capacitor to discharge through said load and said controlled rectifier.

References Cited by the Examiner

UNITED STATES PATENTS

| 3,045,148 | 7/1962 | McNulty et al. | |
| 3,198,989 | 8/1965 | Mahoney | 307—88.5 |
| 3,201,597 | 8/1965 | Ballan | 307—88.5 |

OTHER REFERENCES

Stasior et al.: General Electric Application Note 90.4, April 1962, p. 27.

ROY LAKE, *Primary Examiner.*

S. H. GRIMM, *Assistant Examiner.*